(12) United States Patent
Watarai

(10) Patent No.: US 7,671,872 B2
(45) Date of Patent: Mar. 2, 2010

(54) METHOD AND APPARATUS FOR DETERMINING CHROMINANCE SPACE

(75) Inventor: Yuji Watarai, Kasugai (JP)

(73) Assignee: Fujitsu Microelectronics Limited, Tokyo (JP)

( * ) Notice: Subject to any disclaimer, the term of this patent is extended or adjusted under 35 U.S.C. 154(b) by 498 days.

(21) Appl. No.: 11/401,309

(22) Filed: Apr. 11, 2006

(65) Prior Publication Data

US 2007/0139738 A1     Jun. 21, 2007

(30) Foreign Application Priority Data

Dec. 20, 2005  (JP) ............................. 2005-366968

(51) Int. Cl.
*G09G 5/02* (2006.01)
(52) U.S. Cl. ........................ 345/600; 345/604; 348/231; 358/518; 358/520; 382/162; 382/166
(58) Field of Classification Search ................. 345/589, 345/597, 600, 604; 382/162, 166
See application file for complete search history.

(56) References Cited

U.S. PATENT DOCUMENTS 4,244,653 A     1/1981  Asai et al.
4,989,080 A *   1/1991  Ito .............................. 358/520
2002/0122120 A1* 9/2002  Hsieh .......................... 348/231
2003/0223633 A1* 12/2003 Pohjola ....................... 382/166
2004/0119721 A1* 6/2004  Kim ............................ 345/600

FOREIGN PATENT DOCUMENTS

| GB | 2208460 A | 3/1989 |
|----|-----------|--------|
| JP | 09-247701 A | 9/1997 |
| JP | 10-257334 | 9/1998 |
| JP | 10-257334 A | 9/1998 |
| JP | 11-341507 A | 12/1999 |
| JP | 2000-354252 | 12/2000 |
| JP | 2000-354252 A | 12/2000 |
| JP | 2001-285655 A | 10/2001 |
| JP | 2002-330299 A | 11/2002 |

* cited by examiner

*Primary Examiner*—Kimbinh T Nguyen
(74) *Attorney, Agent, or Firm*—Arent Fox LLP

(57) ABSTRACT

A method for determining which one of regions in a chrominance space an input point belongs to. The regions are defined by boundary lines. The method includes generating in the chrominance space a first line, extending through the input point and the origin of the chrominance space, and a second line, connecting a point on the Cb axis of the chrominance space and a point on the Cr axis of the chrominance space. The method further includes comparing coordinates of a first intersection point, at which the first line and the second line intersect, and coordinates of second intersection points, at which the second line and the boundary lines intersect, to determine the region to which the input point belongs.

7 Claims, 7 Drawing Sheets

METHOD AND APPARATUS FOR DETERMINING CHROMINANCE SPACE

CROSS-REFERENCE TO RELATED APPLICATIONS

This application is based upon and claims the benefit of priority from prior Japanese Patent Application No. 2005-366968, filed on Dec. 20, 2005, the entire contents of which are incorporated herein by reference.

BACKGROUND OF THE INVENTION

The present invention relates to a method and apparatus for determining the region of a chrominance space in which an input point (a point to be determined) included in an image signal is located.

Various types of image capturing devices and image reproducing devices determine the region of a chrominance space in which an input point for an image signal is located. Based on the determination result, such devices perform image processing for adjusting or converting the color phase of the image signal. It is desirable that the efficiency for such determination be increased.

The determination of the color phase for an image signal in a chrominance space (Cb-Cr space) will now be discussed with reference to FIG. 1. The region (one of A to E) in the Cb-Cr space to which an input point P of coordinates x, y belongs is determined for determining the color phase. Regions A to E are defined by five boundary lines L1 to L5, which extend through the origin O.

FIG. 2 shows a first prior art example of a method for determining the region of the chrominance space to which the input point P belongs. First, an angle $\alpha P$ formed between a line segment, which connects the input point P with the origin O, and a lateral axis (Cb axis) of the Cb-Cr space is calculated. More specifically, from coordinates x, y, tan $\alpha P$ is obtained by y/x. Thus, $\alpha P$ is obtained from $\tan^{-1}(y/x)$.

The angle $\alpha P$ is then compared with angles $\alpha 1$ to $\alpha 5$, which are formed between the boundary lines L1 to L5 and the lateral axis. This leads to the determination of which one of regions A to E the input point P belongs to.

FIG. 3 shows the operation of a determination device that performs the above determination. A divider 1 calculates y/x based on the coordinates x, y of the input point P and provides the coordinates x, y to a calculation section 2. The calculation section 2 computes $\tan^{-1}(y/x)$ to obtain the angle $\alpha P$ formed between the input point P and the lateral axis and provides the angle $\alpha P$ to comparators 3a to 3e.

The comparators 3a to 3e compare the angle $\alpha P$ with the angles $\alpha 1$ to $\alpha 5$ and provides the comparison result to a determiner 4.

Region codes corresponding to regions A to E are input to the determiner 4. Based on the comparison results of the comparators 3a to 3e, the determiner 4 outputs the region code corresponding to the region to which the input point P belongs. Then, based on the region code output from the determiner 4, a predetermined adjustment is performed on the color phase of the input point P.

A second prior art example of a method for determining the region in the chrominance space to which the input point P belongs will now be described with reference to FIG. 4.

First, an outer product of the coordinates x, y of the input point P and vectors (x1, y1) to (x5, y5) of each of the five boundary lines L1 to L5, which define regions A to E, are computed. For example, with regard to the vector x1, y1 of the boundary line L1 and the coordinates x, y of the input point P, the value of (x×y1)−(y×x1) is computed. In the same manner, with regard to the vectors L2 to L5, the values of (x×y2)−(y×x2), (x×y3)−(y×x3), (x×y4)−(y×x4), and (x×y5)−(y×x5) are computed.

An outer product having a negative value indicates that the input point P is located in a right semicircle of the corresponding one of the boundary lines L1 to L5. An outer product having a positive value indicates that the input point P is located in a left semicircle of the corresponding one of the boundary lines L1 to L5. The determination of the one of the regions to which the input point P belongs is determined in accordance with the values of the five outer products.

FIG. 5 shows the operation of a determination device used in the second prior art example. Multipliers 5a to 5j perform the above multiplications. Subtracters 6a to 6e perform the above subtractions and provide the results to comparators 7a to 7e.

The comparators 7a to 7e compare the computation results of the corresponding subtracters 6a to 6e and provide the comparison results to a determiner 8. Based on the comparison results of the comparators 7a to 7e, the determiner 8 outputs the region code corresponding to the region to which the input point P belongs. Then, based on the region code output from the determiner 8, a predetermined adjustment for the color phase of the input point P is performed.

Japanese Laid-Open Patent Publication Nos. 10-257334 and 2001-285655 describe defining chrominance space regions with lines extending through the origin and determining the color phase based on the region. Japanese Laid-Open Patent Publication No. 9-247701 describes performing color correction for each region defined in the chrominance space. Japanese Laid-Open Patent Publication No. 11-341507 describes a color determination in the Cb-Cr space and a color signal correction process that is based on the determination result.

SUMMARY OF THE INVENTION

In the determination method shown in FIG. 2, the division of y/x based on the coordinates x, y of the input point P and the computation of $\tan^{-1}(y/x)$ are burdensome. Further, the divider 1 and the calculation section 2 have a large circuit scale, and the chip to which the divider 1 and the calculation section 2 are mounted consume much power.

In the determination method of FIG. 4, the outer products of the coordinates x, y of the input point P and the vectors (x1, y1 to x5, y5) of the five boundary lines L1 to L5 defining the regions A to E must be computed. Further, the multipliers 5a to 5k must perform multiplications for a number of times that is two times greater than the quantity of the boundary lines. As the number of regions increases, the multiplication processing amount drastically increases and enlarges the circuit scale of the multiplier. This increases the power consumption of the chip to which the multiplier is mounted.

The present invention provides a method and device for determining a region in a chrominance space with few computations.

One aspect of the present invention is a chrominance space region determination method for determining which one of regions in a chrominance space an input point belongs to. The chrominance space has an origin, a Cb axis, and a Cr axis, and the regions are defined by boundary lines. The method includes generating in the chrominance space a first line, extending through the input point and the origin, and a second line, connecting a point on the Cb axis and a point on the Cr axis. The method further includes comparing coordinates of a first intersection point, at which the first line and the second line intersect, and coordinates of second intersection points, at which the second line and the boundary lines intersect, to determine the region to which the input point belongs.

Another aspect of the present invention is a chrominance space region determination apparatus for determining which one of regions in a chrominance space an input point belongs to. The chrominance space has an origin, a Cb axis, and a Cr axis, and the regions are defined by boundary lines. The apparatus includes a coordinate calculation unit for computing coordinates of a first intersection point in the chrominance space at which a first line, extending through the input point and the origin, intersects with a second line, connecting a point on the Cb axis and a point on the Cr axis. A determination device compares the coordinates of the first intersection point with coordinates of second intersection points, at which the second line and the boundary lines intersect, to determine the region to which the input point belongs.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

A chrominance space region determination method according to a preferred embodiment of the present invention will now be discussed.

Figure 1:
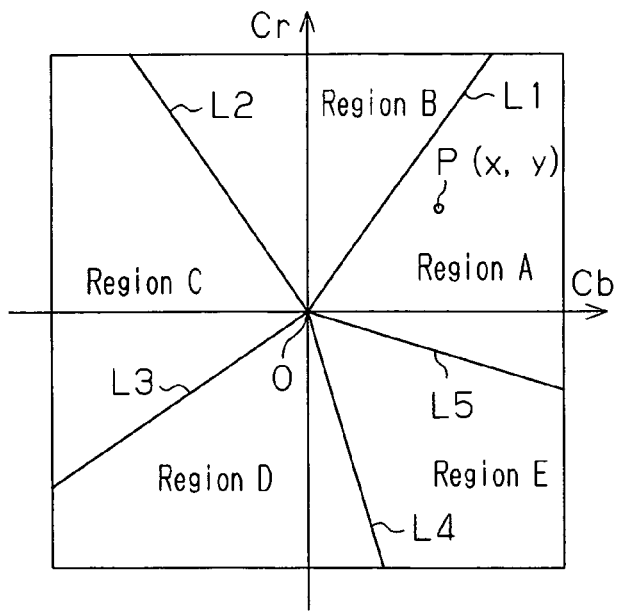
FIGS. 1 and 2 are explanatory diagrams showing a region determination process in a first prior art example.
Figure 2:
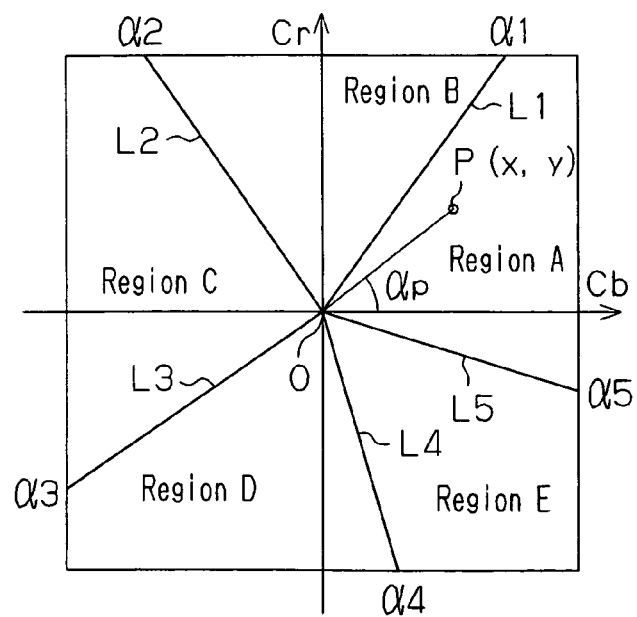
Figure 3:
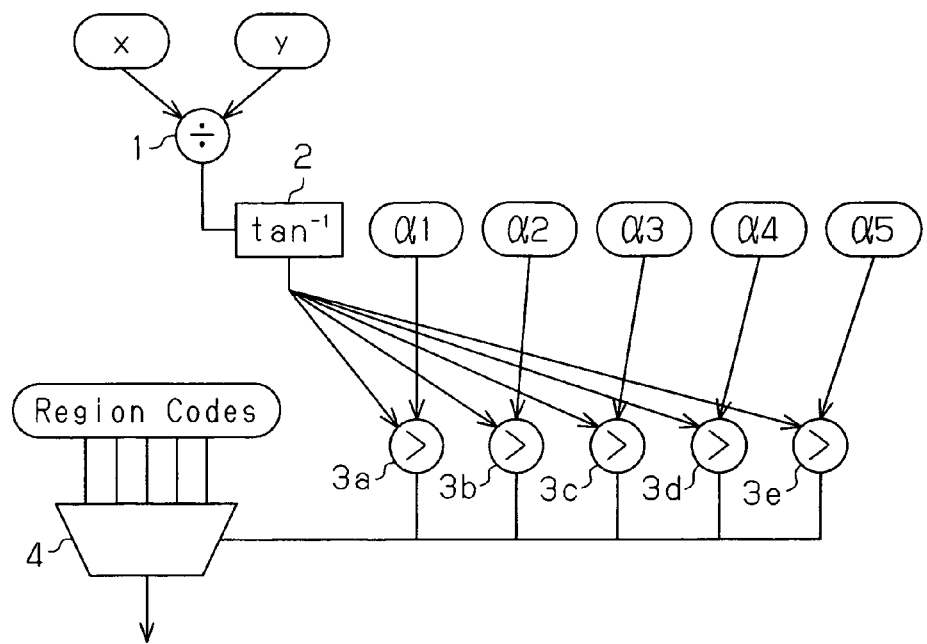
FIG. 3 is a block diagram of a region determination region in the first prior art example.
Figure 4:
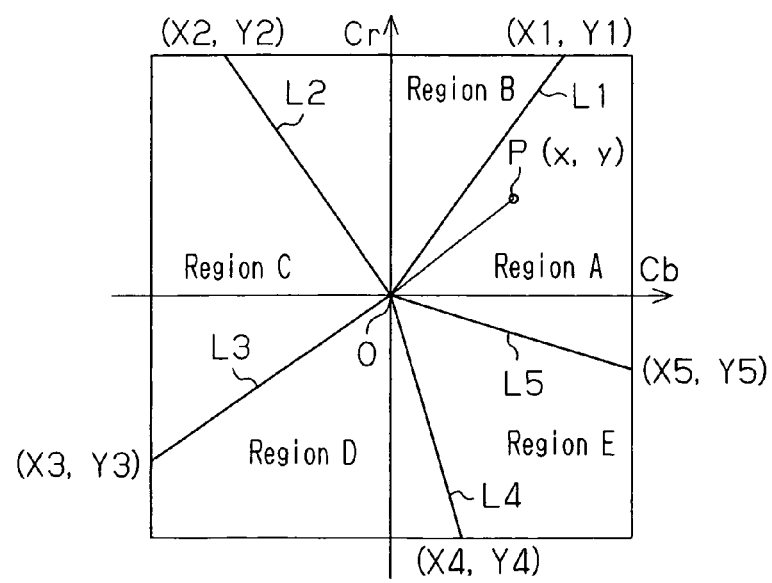
FIG. 4 is an explanatory diagram showing a region determination process in a second prior art example.
Figure 5:
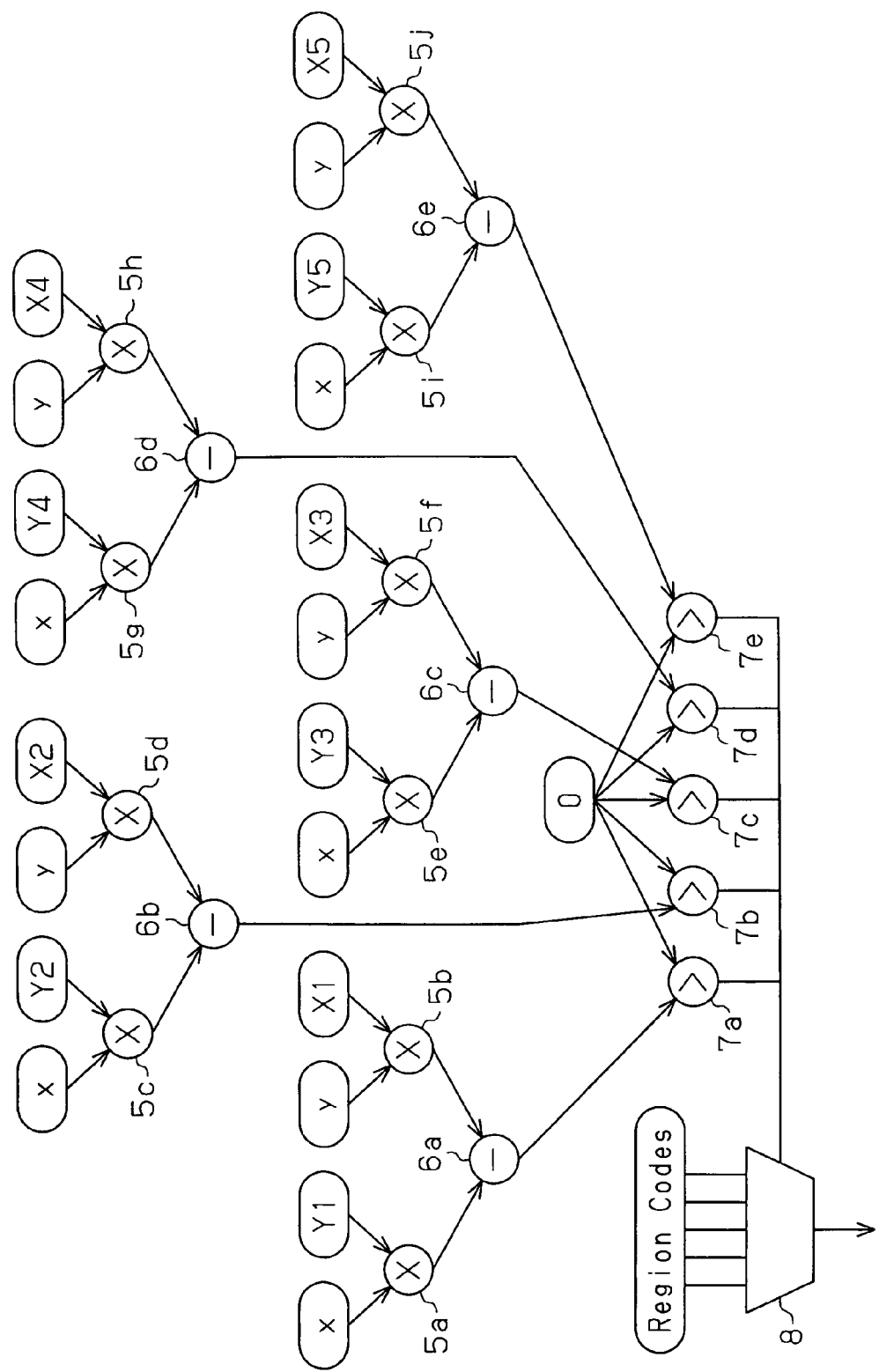
FIG. 5 is a block diagram of a region determination region in the second prior art example.
Figure 6:
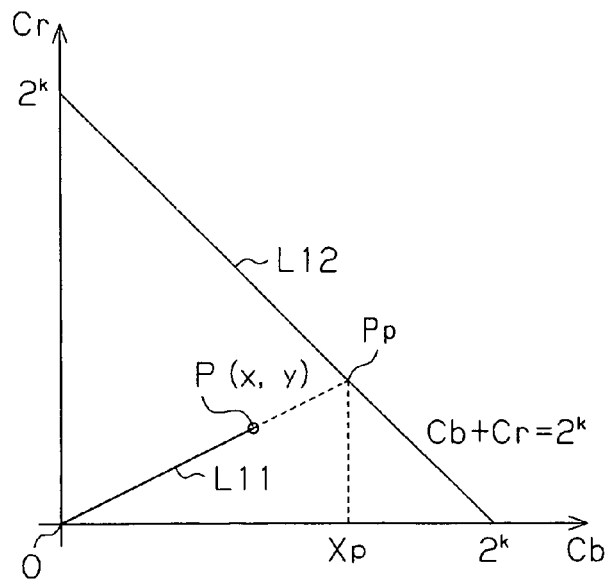
FIGS. 6 to 9 are explanatory diagrams showing a region determination process according to a preferred embodiment of the present invention.

In FIG. 6, a line L11 (first line) connecting an input point P at coordinates x, y with origin O is represented by $x \cdot Cr = y \cdot Cb$. First, a Cb coordinates Xp of an intersection point Pp of the line L11 and a line L12 (second line) represented by $Cb + Cr = 2^k$ (k=1, 2, 3, ...) is computed. The Cb coordinates Xp satisfies $Xp = 2^k \times x/(x+y)$.

Figure 7:
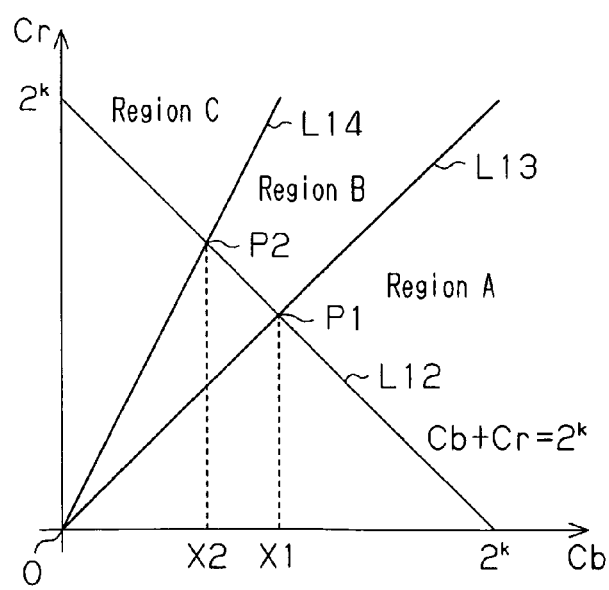

Then, referring to FIG. 7, with regard to boundary lines L13 and L14 defining regions A to C in the chrominance region, Cb coordinates X1 and X2 of intersection points P1 and P2 of the boundary lines L13 and L14 and a line L12 are computed. The Cb coordinates X1 and X2 are boundary setting values.

Figure 9:
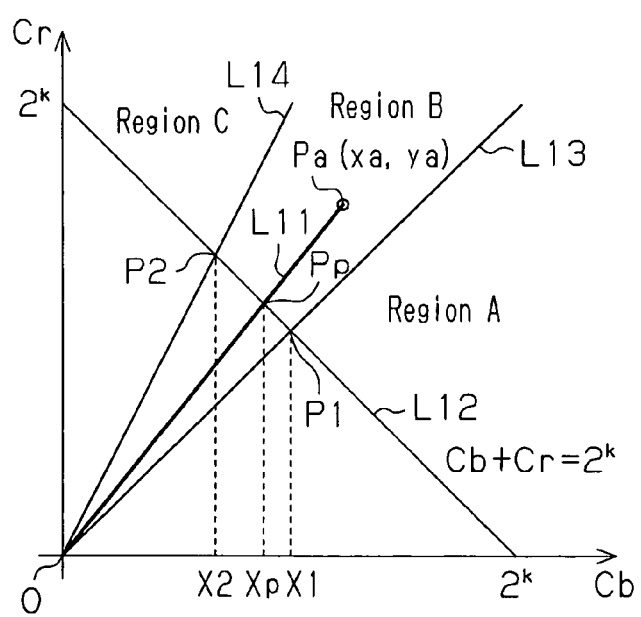

Referring to FIG. 9, the coordinates X1 and X2, which are boundary setting values, and the coordinates Xp are compared to enable determination of which one of the regions to C the input point P (Pa in FIG. 9) belongs to.

Figure 8:
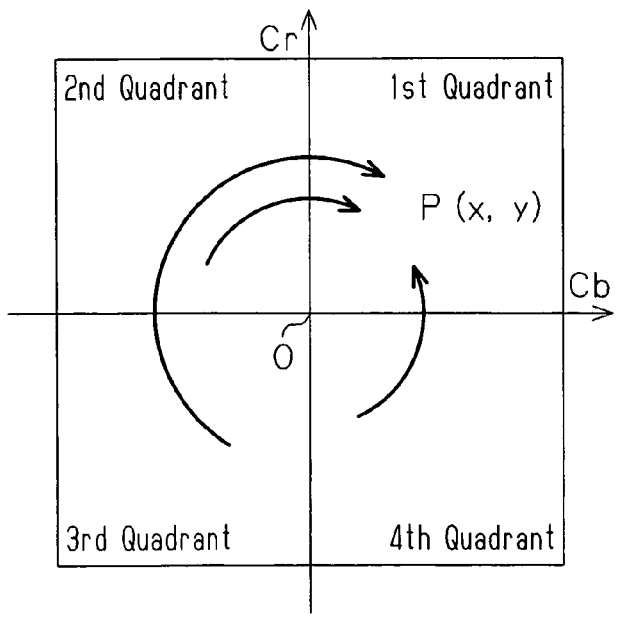

FIG. 6 shows a case in which the input point P is located in the first quadrant of the chrominance space. If the input point P is located in any one of the second to fourth quadrants, the quadrant is rotated about the origin O to overlap with the first quadrant, as shown in FIG. 8.

More specifically, when the input point P at coordinates x, y is located in the second quadrant, the quadrant is rotated to the first quadrant and the coordinates become P(y, −x). When the input point P at coordinates x, y is located in the third quadrant, the quadrant is rotated to the first quadrant and the coordinates become P(−x, −y). When the input point P at coordinates x, y is located in the third quadrant, the quadrant is rotated to the first quadrant and the coordinates become P(−y, x).

Then, a Cb coordinates Xp of the intersection point of the line L12 and a line connecting each coordinates and the origin O is computed. With regard to the second to fourth quadrants, the Cb coordinates of the line L12 and the boundary lines dividing the chrominance space is computed. The Cb coordinates is then compared with the Cb coordinates Xp.

Figure 10:
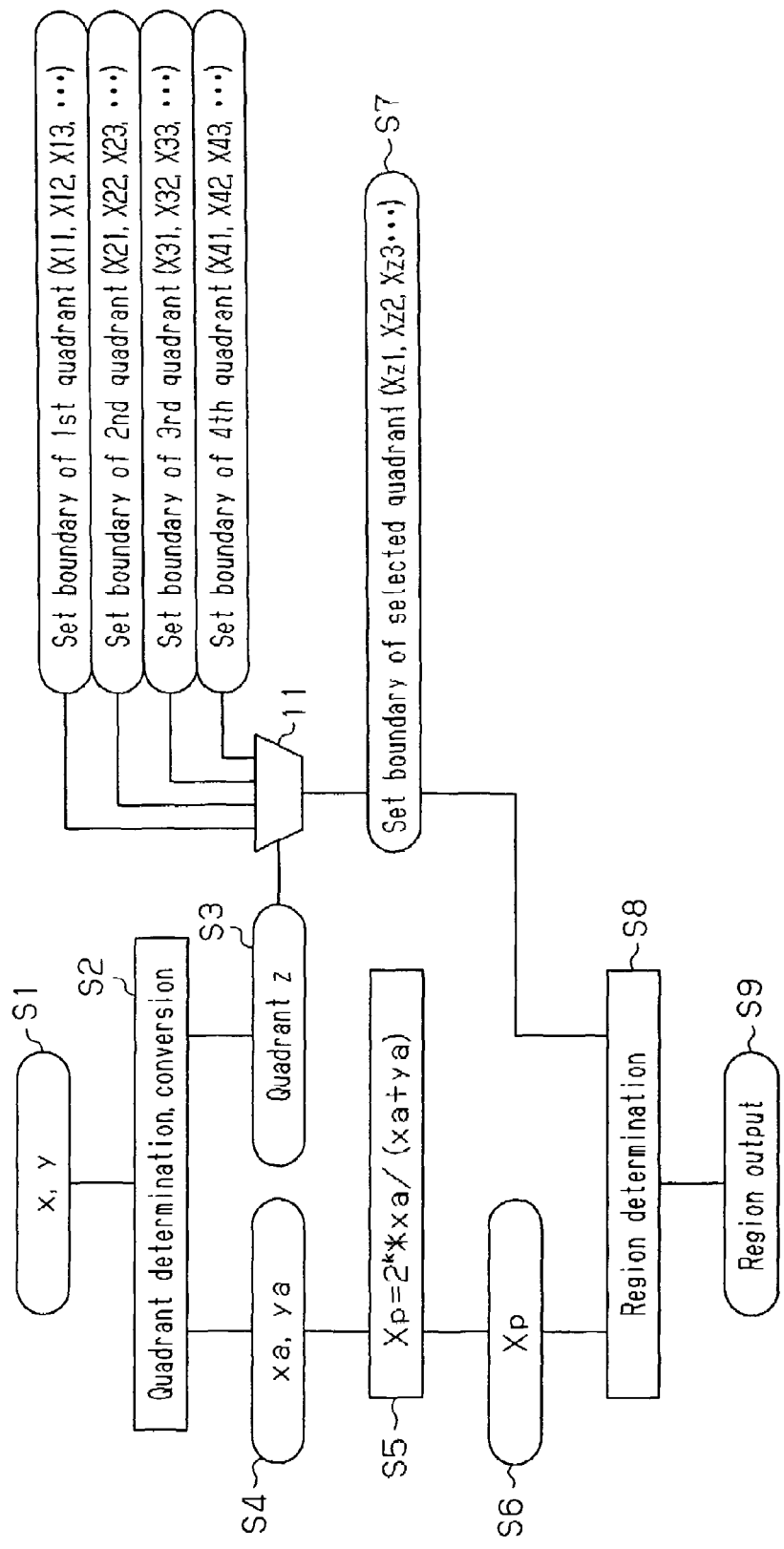
FIG. 10 is a flowchart showing a region determination process of the preferred embodiment.

The region determination method will now be described with reference to FIG. 10. The quadrant to which input point P belongs to is determined. When the input point P belongs to any one of the second to fourth quadrants, a quadrant conversion process is performed to rotate the quadrant to which the input point P belongs so that the quadrant overlaps with the first quadrant at steps S1 and S2.

The determined quadrant Z is provided to the selector 11 at step S3, and the coordinates xa, ya of the input point Pa that has undergone the quadrant conversion process is computed at step S4. Then, the Cb coordinates Xp is calculated based on the coordinates xa, ya of the input point Pa at steps S5 and S6.

The boundary setting values of the first to fourth quadrants are input to the selector 11. The boundary setting values of the second to fourth quadrants are converted beforehand to values corresponding to a state rotated to the first quadrant. The boundary setting value corresponding to the quadrant z input to the selector 11 is selected and output as the boundary setting value of the selected quadrant at step S7.

Then, region determination is performed based on the selected boundary setting value and the Cb coordinates Xp of the coordinates Xp at step S8, and the determination result is output at step S9.

Figure 11:
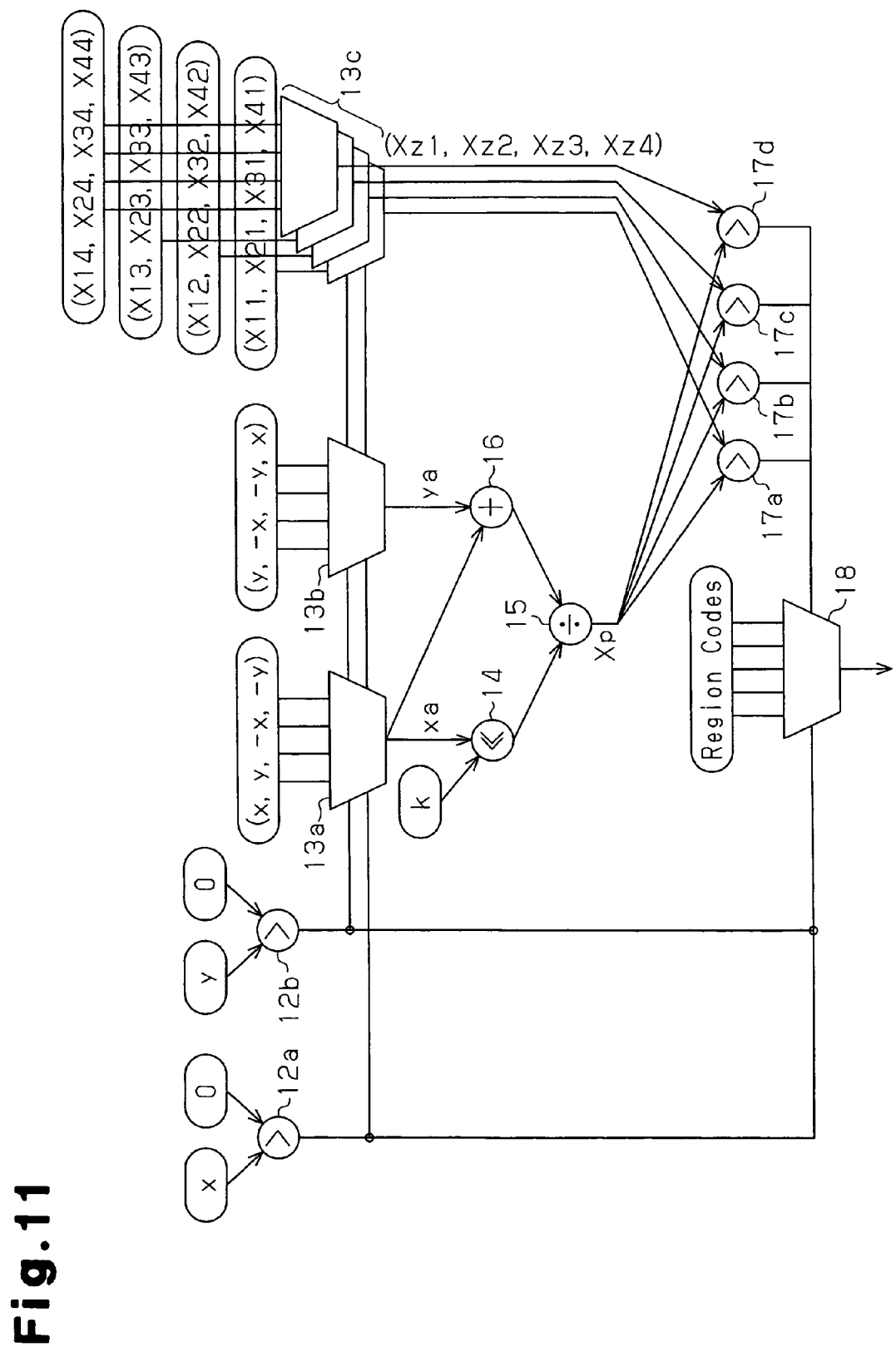
FIG. 11 is a block diagram showing a region determination device of the preferred embodiment.

FIG. 11 shows an example for performing the above region determination process. A comparator 12a compares coordinates x of the input point P with 0 and provides the comparison result to selectors 13a to 13c. A comparator 12b compares the coordinates y of the input point P with 0 and provides the comparison result to the selectors 13a to 13c.

Based on the comparison results of the comparators 12a and 12b, the selector 13a selects and outputs one of x, y, −x, and −y, which are obtained from the coordinates x, y of the input point P, as a coordinates xa subsequent to the quadrant rotation process.

Based on the comparison results of the comparators 12a and 12b, the selector 13b selects and outputs one of y, −x, −y, and x, which are obtained from the coordinates x, y of the input point P, as a coordinates ya subsequent to the quadrant rotation process.

The comparators 12a and 12b and the selectors 13a and 13b perform the quadrant determination process and the quadrant conversion process. The comparators 12a and 12b function as a quadrant determiner. The selectors 13a and 13b function as a quadrant converter. A coordinate calculation unit includes a multiplier 14, a divider 15, an adder 16, the comparators 12a and 12b, and the selectors 13a and 13b.

The coordinates xa output from the selector 13a is provided to the multiplier 14. A numerical value k is input to the multiplier 14 to set $2^k$. The multiplier 14 performs the computation of $2^k \times xa$ and provides the result to the divider 15.

The coordinates xa output from the selector 13a and a coordinates ya output from the selector 13b are provided to the adder 16. The adder 16 performs the computation of xa+ya and provides the computation result to the divider 15. The divider 15 performs the division of $2^k \times x/a(xa+ya)$ to compute coordinates Xp, which is provided to the comparators 17a to 17d.

The boundary setting values of the first to fourth quadrants are input beforehand to the selector 13c as the values of the quadrants when rotated to the first quadrant. FIG. 11 shows a case in which each quadrant includes five regions defined by four boundary setting regions. Based on the comparison results of the comparators 12a and 12b, the selector 13c selects the boundary setting values of the quadrant corresponding to the input point P and provides the selected boundary setting values to the comparators 17a to 17d.

The comparators 17a to 17d compare the coordinates Xp and the boundary setting values of the selected quadrant and provide the comparison results to the determiner 18. The comparators 17a to 17d and the determiner 18 function as a determination device.

Region codes corresponding to the five regions and the comparison results of the comparators 12a and 12b are input to the determiner 18. Based on the comparison results of the comparators 12a and 12b and the comparators 17a to 17d, the region code corresponding to the quadrant and the region to which the input point P belongs is output.

The preferred embodiment has the advantages described below.

(1) The region in the chrominance space to which the input point P belongs is determined based on the coordinates x, y of the input point P.

(2) In the region determination process, multiplication, addition, division, comparison of the coordinates Xp and the boundary setting values of the coordinates Xp are performed only once. Thus, there is no need to perform a non-linear computation such a $\tan^{-1}$. Accordingly, the circuit scale of the coordinate calculation unit, which includes the multiplier 14, the divider 15, and the adder 16, is not enlarged. This prevents the circuit area and power consumption of the coordinate calculation unit from increasing.

(3) Even if the number of regions increases, this may be coped by simply increasing the number of comparators for comparing the coordinates Xp and the boundary setting values of the selected quadrant. Accordingly, the amount of computations and the circuit scale are prevented from being increased.

(4) Even if the input point P is located in any one of the first to fourth quadrants of the chrominance space, the region to which the input point P belongs to in the quadrant can be determined.

It should be apparent to those skilled in the art that the present invention may be embodied in many other specific forms without departing from the spirit or scope of the invention. Particularly, it should be understood that the present invention may be embodied in the following forms.

In the preferred embodiment, if the chrominance space has only the first quadrant, the quadrant determination and quadrant conversion may be eliminated. This would further simplify the region determination process.

The present examples and embodiments are to be considered as illustrative and not restrictive, and the invention is not to be limited to the details given herein, but may be modified within the scope and equivalence of the appended claims.

What is claimed is:

1. A chrominance space region determination method performed by a chrominance space region determination apparatus for determining which one of regions in a chrominance space an input point belongs to, the chrominance space having, a Cb axis, a Cr axis, and an origin which is an intersection of the Cb axis and Cr axis, and the regions being defined by boundary lines each of which extend from the origin on a Cr-Cb area including the Cb axis and Cr axis, the method comprising:

computing, with a coordinate calculation unit of the chrominance space region determination apparatus, a coordinate of a first intersection point in the chrominance space at which a first line extending through the input point and the origin intersects with a second line connecting a point on the Cb axis and a point on the Cr axis;

comparing, with a determination device of the chrominance space region determination apparatus, a coordinate of a first intersection point at which the first line and the second line intersect, and coordinates of second intersection points at which the second line and the boundary lines intersect, to determine the region to which the input point belongs.

2. The chrominance space region determination method according to claim 1, wherein the chrominance space is a Cb-Cr space, and the second line is represented by the expression of Cb+Cr=2k (k=1, 2, 3, . . . ).

3. The chrominance space region determination method according to claim 1, wherein the chrominance space includes a first quadrant, a second quadrant, a third quadrant, and a fourth quadrant, and said comparing includes converting, with a quadrant converter of the chrominance space region determination apparatus, the coordinates of the first intersection point and the coordinates of the second intersection points to coordinates in the first quadrant when the input point is located in one of the second to fourth quadrants and comparing, with the determination device, the converted coordinates of the first intersection point with the converted coordinates of the second intersection points.

4. The chrominance space region determination method according to claim 3, wherein said comparing includes:

determining, with the determination device, which one of the first to fourth quadrants the input point is located in based on coordinates of the input point;

when the input point is located in a quadrant other than the first quadrant, converting, with the quadrant converter, the coordinates of the input point based on the determination result to coordinates corresponding to the first quadrant;

selecting the coordinates of the second intersection point corresponding to the quadrant the input point is located in based on the determination result; and comparing, with the determination device, the selected coordinates with the coordinates of the input point.

5. The chrominance space region determination method according to claim 1, wherein said comparing includes comparing a Cb coordinate of the first intersection point and a Cb coordinate of the second intersection point without comparing a Cr coordinate of the first intersection point and a Cr coordinate of the second intersection point.

6. A chrominance space region determination apparatus configured to determine which one of regions in a chrominance space an input point belongs to, the chrominance space having, a Cb axis, a Cr axis, and an origin which is an intersection of the Cb axis and Cr axis, and the regions being defined by boundary lines each of which extend from the origin on a Cr-Cb area including the Cb axis and Cr axis, the apparatus comprising:

a coordinate calculation unit configured to compute a coordinate of a first intersection point in the chrominance space at which a first line extending through the input point and the origin intersects with a second line connecting a point on the Cb axis and a point on the Cr axis; and a determination device configured to compare the coordinate of the first intersection point with coordinates of second intersection points at which the second line and the boundary lines intersect to determine the region to which the input point belongs.

7. The chrominance space region determination apparatus according to claim 6, wherein the coordinate calculation unit includes:

a quadrant determiner for determining the quadrant to which the input point belongs to based on coordinates of the input point; and a quadrant converter for converting, when the input point is located in a quadrant other than a first quadrant, the coordinates of the first intersection point and the coordinates of the second intersection points to coordinates in the first quadrant.

* * * * *